United States Patent
Yamashita

(10) Patent No.: US 6,256,500 B1
(45) Date of Patent: *Jul. 3, 2001

(54) MOBILE RADIO COMMUNICATION SYSTEM WITH MACRO AND MICRO CELL HANDOFF BASED ON MOBILE DETERMINED CROSSING RATES AND FADING RATES

(75) Inventor: Tetsuya Yamashita, Tokyo (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,351

(22) Filed: Dec. 23, 1997

(30) Foreign Application Priority Data

Dec. 26, 1996 (JP) ...................................... 8-347319

(51) Int. Cl.⁷ ....................................................... H04Q 7/22
(52) U.S. Cl. .......................... 455/441; 455/444; 455/437; 455/525
(58) Field of Search ..................................... 445/441, 440, 445/436, 437, 438, 439, 442, 443, 444, 509, 515, 524, 525

(56) References Cited

U.S. PATENT DOCUMENTS

| | | | |
|---|---|---|---|
| 5,327,575 | * 7/1994 | Menich et al. | 455/440 X |
| 5,436,956 | * 7/1995 | Shiotsuki et al. | 455/441 |
| 5,548,806 | 8/1996 | Yamaguchi et al. | 466/33.1 |
| 5,548,808 | * 8/1996 | Bruckert et al. | 455/442 |
| 5,574,971 | * 11/1996 | Aihara | 455/441 |
| 5,907,808 | * 5/1999 | Vaara et al. | 455/441 |

FOREIGN PATENT DOCUMENTS

| | | |
|---|---|---|
| 54-92101 | 7/1979 | (JP) . |
| 5-130018 | 5/1993 | (JP) . |
| 6-224828 | 8/1994 | (JP) . |
| 8-331637 | 12/1996 | (JP) . |

* cited by examiner

Primary Examiner—Fan Tsang
Assistant Examiner—Philip J. Sobutka
(74) Attorney, Agent, or Firm—Foley & Lardner

(57) ABSTRACT

A radio base station broadcasts system information through a control channel. Each mobile station receives system information (at step S21) and determines the moving speed thereof (at step S22). When the mobile station is moving at high speed, the mobile station measures the field intensities of available channels on which the mobile station can communicate with a macro cell radio base station (at step S23 or S27). When the mobile station is moving at low speed, the mobile station measures the field intensities of available channels on which the mobile station can communicate with a micro cell radio base station (at step S27 or S23). However, when the radio base station to which the mobile station is moving is different from the radio base station from which the mobile station has received the control channel at first, the mobile station receives new system information from the relevant base station at step S26. The mobile station selects a channel corresponding to the measured result and starts communicating with the new radio base station (at steps S24 and S25).

2 Claims, 2 Drawing Sheets

MOBILE RADIO COMMUNICATION SYSTEM WITH MACRO AND MICRO CELL HANDOFF BASED ON MOBILE DETERMINED CROSSING RATES AND FADING RATES

BACKGROUND OF THE INVENTION

1. Field of the Invention

The present invention relates to a mobile radio communication system of which a service area is composed of macro cells that are subdivided into micro cells.

2. Description of the Related Art

As a conventional mobile radio communication system, a related art reference disclosed in Japanese Patent Laid-Open Publication No. 5-130018 is known. In the mobile radio communication system, to solve problems of shortage of channels and reduction of occurrences of hand-off, as shown in FIG. 3, the service area is composed of macro cells 31, each of which is composed of micro cells 32. A terminal unit communicates with a macro cell radio base station or a micro cell radio base station corresponding to the traveling speed of the terminal unit.

In the mobile radio communication system, to allow a mobile station in the service area to communicate with a radio base station, a communication channel should be assigned for each communication session demanded for communication. Normally, the channel assignment is processed on the radio base station side (controlling station). Likewise, this process is performed in the above-described mobile radio communication system.

Thus, the radio base station side should perform many process steps for the management of communication channels such as checking out assignable communication channels, measuring the field intensity of a radio wave transmitted by each mobile station, determining the permission of a communication request issued by each mobile station, and monitoring a communication state (line quality) in the communication.

When a mobile station that is communicating with a radio base station moves to an adjacent radio area, to keep the communication, the original communication channel should be switched to an optimum channel that a radio base station in the adjacent radio area provides. In this case, in the conventional mobile radio communication system, as with selecting a channel in the communication start time, the radio base station side selects a channel for communicating with the radio base station in the adjacent radio area to which the mobile station will move.

To alleviate the process performed on the radio base station side, a method for causing each mobile station to select a communication channel has been used in some systems. However, in this method, since each mobile station only measures the field intensities of available channels and selects a channel with the strongest field intensity, the mobile station does not sufficiently have information about the system structure and the current system state. In addition, since each mobile station selects a channel corresponding to the field intensities of received channels, the process on the radio base station side is applied to the mobile station side. Thus, each mobile station occasionally fails to select an optimum channel.

As a first problem in such a conventional mobile radio communication system, when communications between mobile stations and a relevant radio base station get congested or when a new channel is assigned between each mobile station and the relevant radio base station or the current channel is switched to a new channel, the process performance on the radio base station side deteriorates.

This is because only the radio base station side performs a determining process and a selecting process for assigning a channel.

As a second problem in such a conventional mobile radio communication system, the radio base station side selects a channel necessary for communicating between the mobile station and the relevant radio base station. However, the selected channel is not optimum for the state of each mobile station. The communication quality of the selected channel may be so bad as the current channel should be switched to another channel just after the communication initiates. Alternatively, in this case, the communication may be immediately disconnected.

This is because the radio base station side does not have an effective means for monitoring the moving speed and so forth of each mobile station. For example, when a communication channel of a radio base station that has a very small radio area is assigned to a mobile station that is moving at high speed, the mobile station moves to an adjacent radio area in a short time. Thus, the communication quality rapidly deteriorates. In other words, an improper channel may be assigned to each mobile station.

SUMMARY OF THE INVENTION

An object of the present invention is to provide a mobile radio communication system that allows each mobile station to monitor the state thereof such as moving speed and moving direction, the structure of adjacent cells, the system structure such as available channels of each cell, and the current state thereof and each mobile station to select an optimum channel, thereby alleviating the load applied to the radio base station side.

A first aspect of the present invention is a mobile radio communication system, comprising a radio base station having a inherent radio area, and a mobile station, disposed in the inherent radio area, for communicating with the radio base station, wherein the radio base station comprises a broadcasting means for broadcasting particular system information through a control channel, and wherein the mobile station comprises a speed determining means for measuring a state of the received control channel and determining the moving speed of the mobile station, and a channel selecting means for receiving the system information and selecting an optimum channel on which the mobile station communicates with the radio base station corresponding to the moving speed determined by the speed determining means from channels that the system information represents.

According to the present invention, there are a plurality of radio base stations, each of the radio base stations placing information representing available channels of the adjacent radio base stations of each of the radio base stations to the system information and broadcasting the resultant information so as to switch the current channel to an optimum channel when the mobile station moves from the radio area of a radio base station with which the mobile station is communicating to an adjacent radio area thereof, and wherein the mobile station further comprises a destination identifying means for receiving control channels from the individual radio base stations and identifying a radio area to which the mobile station will move corresponding to the states of the received control channels, an information extracting means for extracting information representing channels available for the radio base station in the radio area identified by the destination identifying means from the system information, and wherein the channel selecting means selects an optimum channel for communicating with the relevant radio base station corresponding to the moving speed determined by the speed determining means.

A second aspect of the present invention is a mobile radio communication system, comprising a macro cell radio base station for forming a macro cell, a micro cell radio base station for forming a micro cell, at least part of the micro cell overlapping with the macro cell, and a mobile station for communicating with the macro cell radio base station when the mobile station is in the macro cell, for communicating with the micro cell radio base station when the mobile station is in the micro cell, for receiving a control channel from the macro cell radio base station or the micro cell radio base station, for determining the moving speed thereof corresponding to the state of the received control channel when the mobile station is present at a position of which the macro cell and the micro cell overlap with each other, for communicating with the macro cell radio base station when the moving speed of the mobile station exceeds a predetermined speed, and for communicating with the micro cell radio base station when the moving speed of the mobile station is less than the predetermined speed.

The mobile radio communication system according to the present invention further comprising a radio-base-station controlling station for controlling the macro cell radio base station and the micro cell radio base station, wherein the macro cell radio base station and the micro cell radio base station broadcast channels available in the other radio base station through the control channel corresponding to control information received from the radio-base-station controlling station.

A third aspect of the present invention is a mobile radio communication system, comprising a plurality of macro cell radio base stations for forming macro cells, a plurality of micro cell radio base stations forming micro cells, each of the micro cells being smaller than each of the macro cells, at least part of each of the macro cells overlapping with a relevant macro cell, a radio-base-station controlling station for controlling the macro cell radio base stations and the micro cell radio base stations, and a mobile station, being present in at least either a macro cell or a micro cell, for communicating with one of the macro cell radio base stations or one of the micro cell radio base stations, wherein each of the macro cell radio base stations and the micro cell radio base stations comprises a broadcasting means for broadcasting system information through a relevant control channel corresponding to control information received from the radio-base-station controlling station, and wherein the mobile station comprises a speed determining means for measuring the state of the received control channel and determining the moving speed of the mobile station, and a channel selecting means for receiving the system information and selecting an optimum channel for communicating with the relevant radio base station from channels that the system information represents corresponding to the moving speed determined by the speed determining means.

According to the present invention, the mobile station communicates with one of the macro cell radio base stations when the moving speed of the mobile station exceeds a predetermined speed, and wherein the mobile station communicates with one of the micro cell radio base stations when the moving speed of the mobile station is less than the predetermined speed.

According to the present invention, the system information contains information representing channels available in adjacent radio base stations of each of the macro cell radio base stations and the micro cell radio base stations, and wherein when the mobile station moves from the cell of the relevant radio base station with which the mobile station is communicating to an adjacent cell thereof, the moving direction of the mobile station is obtained corresponding to the variation of the field intensity of the received control channel, a radio base station with a channel to which the current channel of the mobile station is switched being determined corresponding to the obtained moving direction and the moving speed determined by the speed determining means, information representing channels available in the determined radio base station being extracted from the system information, an optimum channel being selected by the channel selecting means.

According to the present invention, each radio base station transmits information representing a candidate channel of available communication channels thereof and available channel alternatives in adjacent radio areas from a communicating radio area on a control channel transmitted as a common channel to all mobile stations corresponding to information supplied by a radio-base-station controlling station.

Each mobile station receives the control channel from the relevant radio base station, detects the fading state thereof, and determines that the mobile station is moving at high speed when the fading rate is high (namely, the crossing rate to a particular constant value is large). In contrast, each mobile station determines that the mobile station itself is moving at low speed or stops when the crossing rate to the particular constant value is small.

When each mobile station starts communicating with the relevant radio base station, the mobile station selects an optimum communication channel corresponding to the determined moving speed with the information received through the control channel. When each mobile station moves among radio areas, the mobile station selects an optimum available channel from the available channel alternative group contained in the information received through the control channel corresponding to the received level and the moving speed.

These and other objects, features and advantages of the present invention will become more apparent in light of the following detailed description of a best mode embodiment thereof, as illustrated in the accompanying drawings.

DESCRIPTION OF PREFERRED EMBODIMENTS

A mobile radio communication system according to an embodiment of the present invention will be described with reference to the accompanying drawings.

The mobile radio communication system according to the present invention comprises a plurality of mobile stations, a plurality of radio base stations, and a radio-base-station controlling station. The radio base stations provide service areas for the mobile stations. The radio-base-station controlling station controls the radio base stations. The radio base stations are categorized as macro cell radio base stations and micro cell radio base stations. The macro cell radio base stations form macro cells (wide radio areas). The micro cell radio base stations form micro cells (narrow radio areas) that are smaller than the macro cells. It is preferable that the macro cells and the micro cells independently cover the entire service area (namely, the macro cells and the micro cells overlap with each other).

Figure 1:
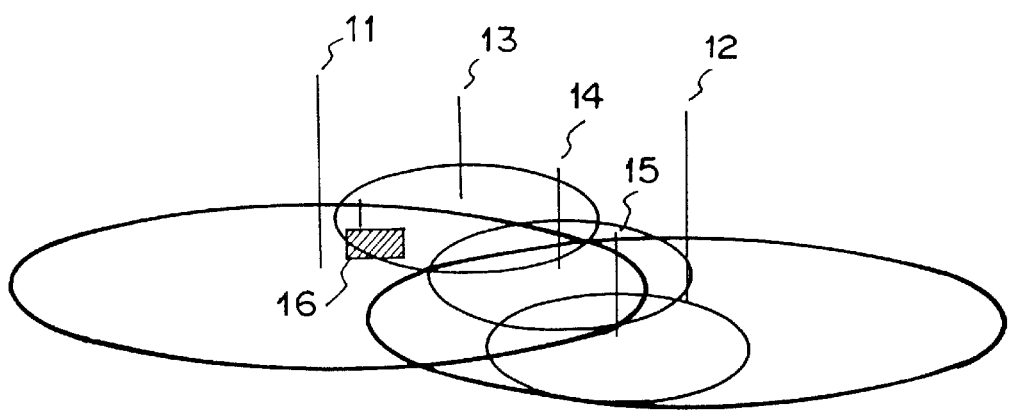
FIG. 1 is a conceptual diagram showing a mobile radio communication system according to an embodiment of the present invention.
Figure 3:
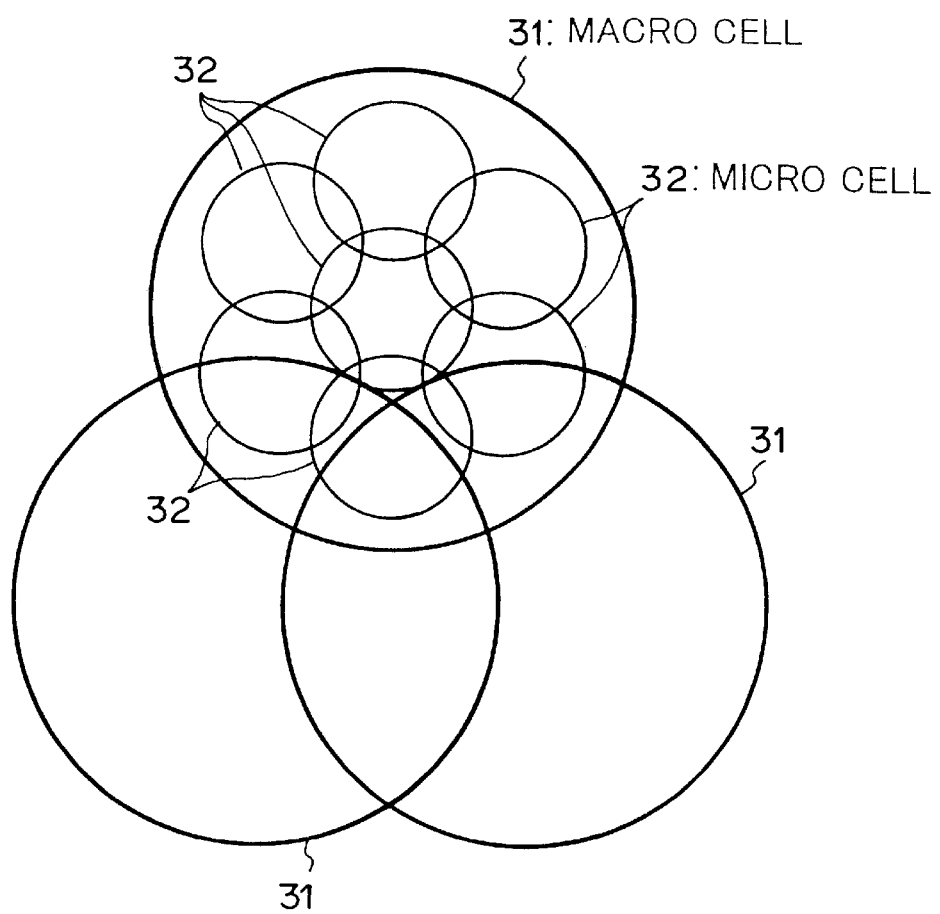
FIG. 3 is a schematic diagram showing the relation between conventional macro cells and micro cells.

For simplicity, in the following description, as shown in FIG. 1, the case of which two macro cell radio base stations 11 and 12 and three micro cell radio base stations 13, 14, and 15 compose the service area. It is assumed that the macro cell radio base stations 11 and 12 have channels A1, A2, and A3 and channels B1, B2, and B3 as channels on which they can communicate with a mobile station 16, respectively. In addition, it is assumed that the micro cell radio base stations 13 and 14 have channels a1, a2, and a3 and channels b1, b2, and b3 as channels on which they can communicate with the mobile station 16, respectively.

Each radio base station periodically broadcasts particular system information to all mobile stations in the relevant radio areas through a control channel (common channel) corresponding to information supplied from a radio-base-station controlling station (not shown).

The mobile station 16 selects a control channel with the strongest field intensity from the available control channels. For example, when the mobile station 16 is present in the radio area of the macro cell radio base station 11, since the field intensity of the control channel of the macro cell radio base station 11 is the strongest, the mobile station 16 receives this control channel. The mobile station starts performing the communication initiating process corresponding to the system information received through the control channel.

The system information received from the macro cell radio base station 11 contains information representing that the radio base station is a radio base station that forms a macro cell (namely, that the radio area of the radio base station is wide, that the radio base station can handle a mobile station that moves at low speed and high speed, and that the available channels are channels A1, A2, and A3). The system information also contains information representing available channels to which the current channel can be switched (for both macro cell radio base stations and micro cell radio base stations).

Figure 2A:
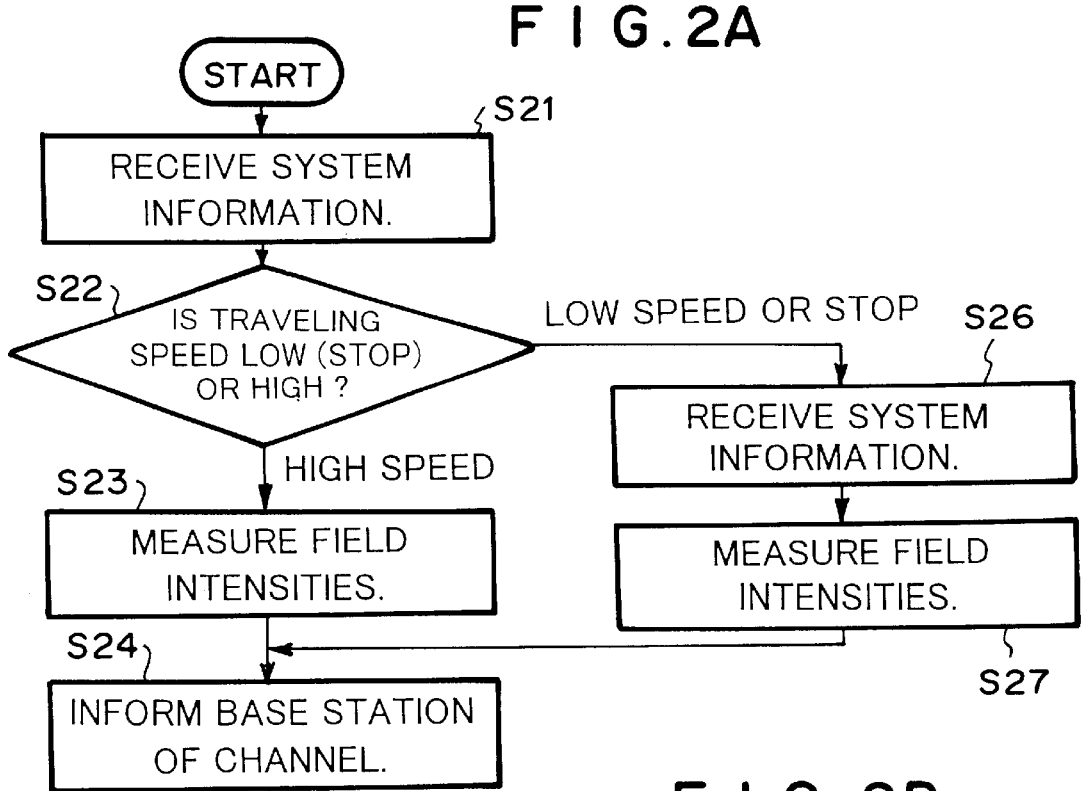
FIG. 2A is a flow chart for explaining the operation of a mobile station shown in FIG. 1 in the case that the mobile station initiates a call.
Figure 2B:
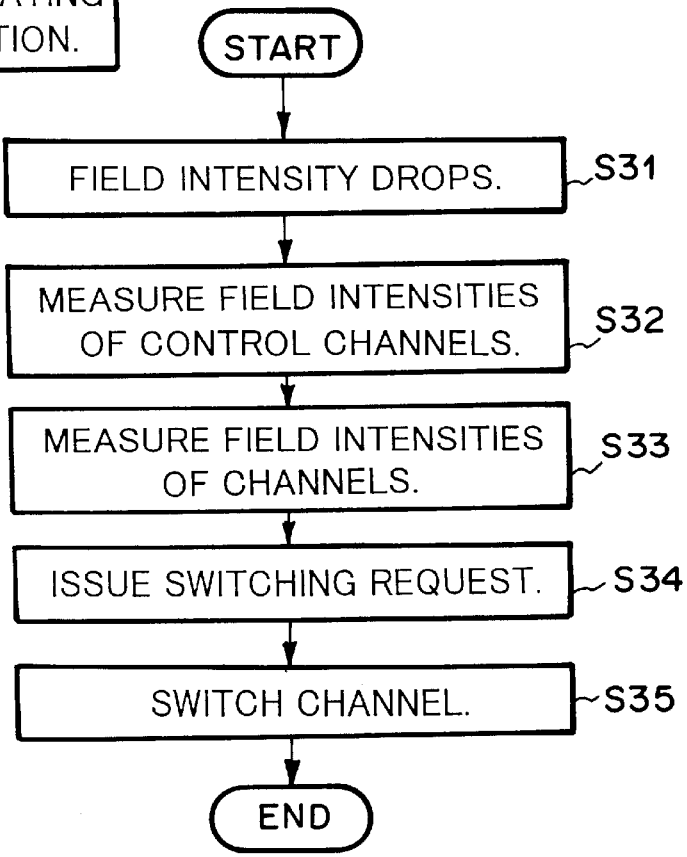
FIG. 2B is a flow chart for explaining the operation of the mobile station shown in FIG. 1 in the case that the mobile station switches the current channel to another channel.

Next, with reference to FIGS. 2A and 2B, the operation of the mobile station 16 will be described. At step S21, the mobile station 16 receives a control channel from the macro cell radio base station 11 and obtains the fading rate of the control channel. The mobile station 16 temporarily stores the received system information in a memory thereof. The system information stored in the memory is updated with new system information received through the control channel periodically or at any time.

At this point, the mobile station 16 receives a control channel from a relevant radio base station, measures the field intensity (RSSI) of the received channel, detects a fluctuation level A and a fluctuation period B of RSSI per predetermined unit time in a multipath transmission environment. Assuming the fading rate to the fluctuation level A versus a fluctuation period B, the fading rate is large when the fluctuation period B is small in the case that the fluctuation level A is large. When the fluctuation period B is small in the case that the fluctuation level A is small, the mobile station 16 determines that the fading rate is small.

In a multipath transmission environment, when a mobile station on a car, a bus, or a bicycle passes through an area of standing waves of broadcasting radio waves, the fading rate is a frequency fluctuation of an electric intensity, that is, when the standing waves occur a period of ½λ wave length distance determined by frequency bands of the mobile radio communication system, while the mobile station moves at constant speed in the multipath transmission environment, the fluctuation of the electric intensity of the mobile can be measured by a constant frequency.

Further, the fading rate may change to a crossing rate. The crossing rate is determined by counting a number of crossings of a threshold value in a constant period. The threshold value of electric intensity is set up for sure and stable reception of an electric wave of a mobile radio communication system. The crossing rate is used for determining whether or not a mobile station is moving at high speed in the environment having the fading rate. The crossing rate is different with respect to the fading rate by the threshold value, but actually, both rates have coincidence.

Next, at step S22, the mobile station 16 determines the moving speed thereof corresponding to the fading rate. When the mobile station 16 is moving at high speed as the determined result at step S22, the flow advances to step S23. At step S23, the mobile station 16 measures the field intensities of the channels A1, A2, and A3 that can be used in communication with the macro cell radio base station 11. Thus, the mobile station 11 checks out the deterioration due to the interference of the same wave that takes place in the case that adjacent cells use the same channel. Corresponding to the measured result, the mobile station 16 selects an optimum channel from the channels A1, A2, and A3.

At step S24, the mobile station 16 informs the macro cell radio base station 11 of the selected channel through the control channel. When the macro cell radio base station 11 can assign the channel selected by the mobile station 16, the macro cell radio base station 11 sends a permission message to the mobile station 16 through the control channel. When the macro cell radio base station 11 cannot assign the channel, it sends a message that represents an alternative channel to the mobile station 16. When the mobile station 16 has received the permission message from the macro cell radio base station 11, the flow advances to step S25.

At step S25, the mobile station 16 starts communicating with the macro cell radio base station 11 on the selected channel. When the mobile station 16 has received the message that represents the alternative channel, it starts communicating with the macro cell radio base station 11 on the alternative channel.

When the mobile station 16 is moving at low speed or stops as the determined result at step S22, the flow advances to step S26. At step S26, the mobile station 16 receives control channels from adjacent micro cell radio base stations that the received system information represents and compares the field intensities thereof. Thereafter, the mobile station 16 receives new system information from a control channel with the strongest field intensity. This system information is the same as the system information received from the macro cell radio base station 11. This system information contains information representing that the radio base station is a radio base station that forms a micro cell and that the available channels are channels c1, c2, and c3. In addition, the system information also contains information representing available channels to which the current channel can be switched.

At step S27, the mobile station 16 selects an optimum channel from the channels c1, c2, and c3 corresponding to the newly received system information and starts communicating with the micro cell radio base station in the above-described manner.

In this example, the case of which the mobile station 16 starts communicating with the macro cell radio base station 11 corresponding to the system information thereof was described. However, likewise, the mobile station 16 can start communicating with a micro cell radio base station corresponding to system information thereof. In addition, in the above description, the mobile station 16 determines the moving speed with the fading rate. Instead, with a conventional car navigator, the mobile station 16 may detect the moving speed and moving direction so as to select an optimum channel corresponding to the flow chart shown in FIG. 2A.

Next, with reference to FIG. 2B, the case of which the mobile station 16 is moving to the radio area of the macro cell radio base station 12 at high speed will be described. When the field intensity of the channel on which the mobile station 16 is communicating with the macro cell radio base station 11 drops to a predetermined value or less at step S31, the flow advances to step S32. At step S32, the mobile station 16 measures the field intensities of control channels of the adjacent macro cells of the macro cell radio base station 11 corresponding to system information stored in the memory. Thus, the mobile station 16 determines that a macro cell radio base station that sends the strongest control channel is a radio base station to which the mobile station 16 is moving (in this case, the macro cell radio base station 12). In addition, along with the field intensities, with the variations thereof, the mobile station 16 can detect a radio base station to which the mobile station 16 is moving.

When the mobile station 16 has determined that a macro radio base station to which the mobile station 16 is moving is the macro cell radio base station 12, the mobile station 16 reads from the memory thereof the channels B1, B2, and B3 available in the radio base station 12. At step S33, the mobile station 16 compares the field intensities of these channels, checks out the deterioration states due to the interference of the same wave, and selects an optimum channel for communicating with the macro cell radio base station 12. Thereafter, at step S34, the mobile station 16 informs the macro cell radio base station 12 of the selected channel through the control channel. At step S35, the mobile station 16 switches the current channel to the selected channel corresponding to the response received from the macro cell radio base station 12.

The operation in which the mobile station 16 is moving at low speed is nearly the same as the operation in which the mobile station 16 is moving at high speed. In other words, when the field intensity of the channel on which the mobile station 16 is communicating with the macro cell radio base station 12 drops to a predetermined value or less, the mobile station 16 measures the field intensities of control channels of the adjacent micro cells to which the mobile station 16 will move corresponding to the system information stored in the memory. The mobile station 16 determines that the micro cell radio base station 14 that is sending a control channel with the strongest field intensity as a radio base station to which the mobile station will move. Thereafter, the mobile station 16 reads channels d1, d2, and d3 available in the micro cell radio base station 14 from the memory. The mobile station 16 compares the field intensities of these channels, checks out the deterioration states due to the interference of the same wave, and selects an optimum channel for communicating with the micro cell radio base station 14. The mobile station 16 informs the macro cell radio base station 12 of the selected channel through the control channel and switches the current channel to the selected channel corresponding to the response received from the macro cell radio base station 12.

In the case that the mobile station 16 is called by a radio base station (in other words, a call is terminated to the mobile station 16), when the mobile station 16 is called through a control channel, the mobile station 16 measures the fading rate of the control channel and determines whether the mobile station 16 is moving at high speed or low speed or stops with the measured fading rate. Thus, the mobile station 16 responds to either a macro cell radio base station or a micro cell radio base station corresponding to the determined result. A channel on which the mobile station 16 and a relevant radio base station communicate is designated in the above-described manner.

According to the present invention, since each mobile station determines its moving speed and selects an optimum channel on which it communicates with a radio base station, it can communicate with the radio base station without deteriorating the process performance on the radio base station side. In this case, the radio base station side only broadcasts information about selectable channels as system information, thereby greatly alleviating the load applied to the radio base station.

In addition, according to the present invention, since either a macro cell radio base station or a micro cell radio base station is selected corresponding to the moving speed of each mobile station, the number of occurrences of hand-off can be decreased. Moreover, available channels can be effectively used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A mobile radio communication system, comprising:
 a plurality of macro cell radio base stations that respectively form macro cells;
 a plurality of micro cell radio base stations that respectively form micro cells, each of the micro cells being smaller than each of the macro cells, at least part of each of the macro cells overlapping with a relevant macro cell;
 a radio-base-station controlling station that controls said macro cell radio base stations and said micro cell radio base stations; and
 a mobile station, being present in at least either a macro cell or a micro cell, the mobile station communicating with one of said macro cell radio base stations or one of said micro cell radio base stations,
 wherein each of said macro cell radio base stations and said micro cell radio base stations comprises:
  a broadcasting unit that broadcasts system information through a relevant control channel corresponding to control information received from said radio-base-station controlling station, and
 wherein said mobile station comprises:
  a speed determining unit that measures the state of the received control channel and determines the moving speed of said mobile station; and a channel selecting unit that receives the system information and selects an optimum channel for communicating with the relevant radio base station from channels that the system information represents corresponding to the moving speed determined by said speed determining unit, wherein the moving speed of said mobile station is detected with one of: a) a fading rate based on a fluctuation level and a fluctuation period of a received signal per unit time, and b) a crossing rate of a received signal received on the received control channel, the crossing rate being calculated with respect to a predetermined threshold value, wherein, when the crossing rate is greater than a predetermined crossing rate within a constant time period, the mobile station is determined to be moving above a predetermined speed level, wherein, at call initiation, said mobile base station communicates with one of said macro cell radio base stations when the moving speed of said mobile station exceeds a predetermined speed, wherein, at call initiation, said mobile base station communicates with one of said micro cell radio base stations when the moving speed of said mobile station is less than said predetermined speed, and wherein, when the mobile station is currently communicating with one of said macro cell base stations, said mobile station switches to perform communicating with one of said micro cell base stations only when both a) the moving speed of said mobile station is less than said predetermined speed, and b) a field intensity of the received control channel of said one of said macro cell base stations is less than a predetermined field intensity.

2. The mobile radio communication system as set forth in claim 1, wherein the relevant macro cell is an adjacently-disposed macro cell.

* * * * *